Patented May 29, 1945

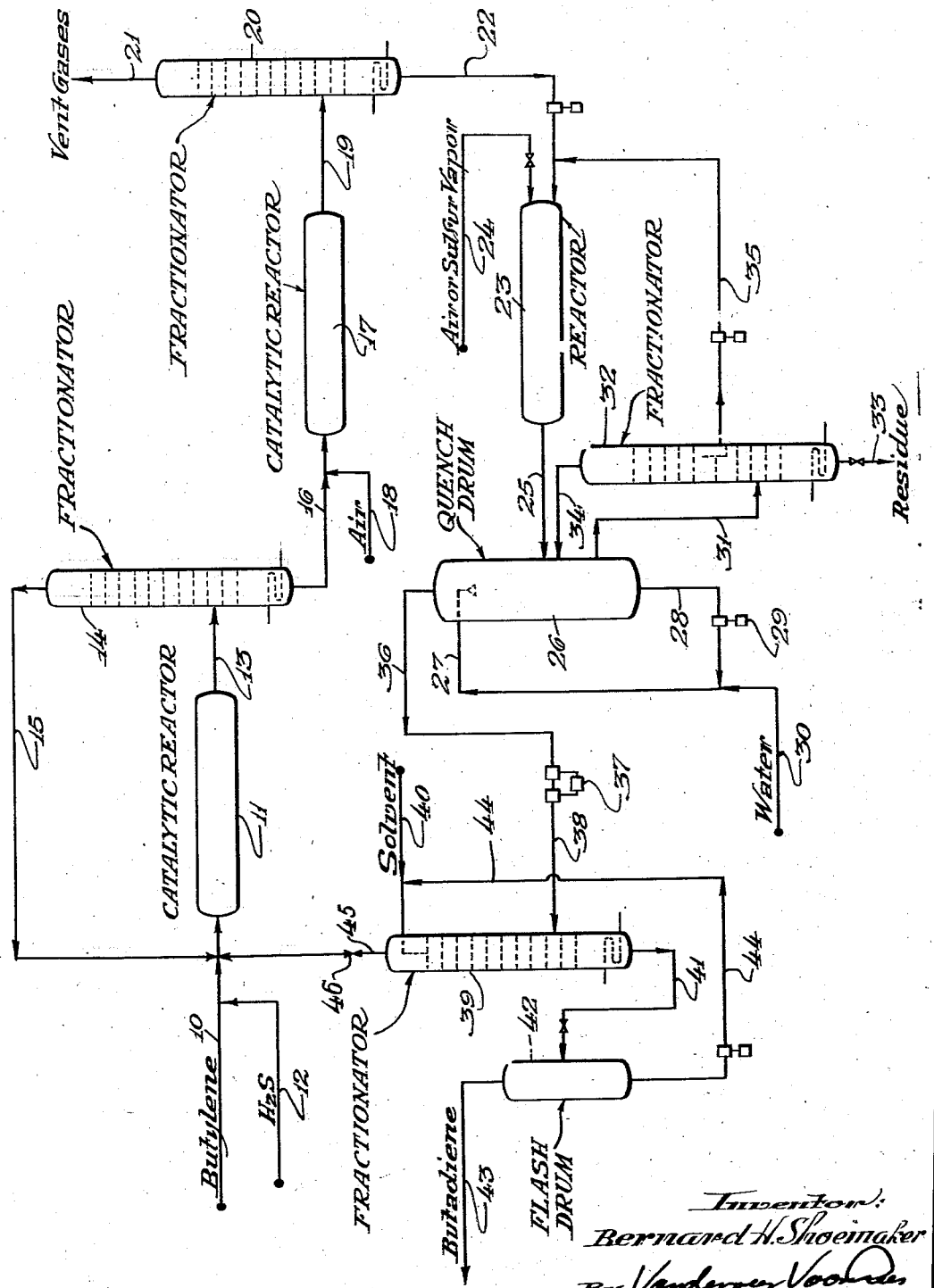

2,376,988

UNITED STATES PATENT OFFICE 2,376,988

PROCESS FOR THE MANUFACTURE OF DIENES

Bernard H. Shoemaker, Hammond, Ind., assignor to Standard Oil Company, Chicago, Ill., a corporation of Indiana Application June 25, 1942, Serial No. 448,336

8 Claims. (Cl. 260—680)

This invention relates to the preparation of dienes from hydrocarbons and from compounds of sulfur with hydrocarbons. More specifically, the invention relates to the preparation of dienes from alkyl sulfides and still more specifically, butadiene from dibutyl disulfide by a pyrolytic reaction.

Numerous processes have been proposed for converting paraffin and olefin hydrocarbons into diolefins and particularly into butadiene and isoprene. The formation of butadiene from paraffins and olefins, however, is beset with the difficulty that whereas the paraffins and olefins are very stable and relatively unreactive, the dienes are notable for their high reactivity and particularly their tendency to polymerize. Accordingly, the processes heretofore proposed for the preparation of the dienes from less unsaturated hydrocarbons have generally resulted in giving low yields and low concentrations of diolefins.

One object of the present invention is to produce a higher yield and a higher concentration of dienes from olefin hydrocarbons. Another object of the invention is to produce dienes from hydrocarbons thru an intermediate compound with sulfur, the sulfur being recovered in the process in a form convenient for reuse.

This application is accompanied by a drawing showing a flow diagram of the process.

In accordance with my process, I may prepare butyl mercaptan by various methods such as the treatment of butylene with hydrogen sulfide as shown by the following reaction:

Other methods may be used for preparing butyl mercaptan, for example the treatment of butyl alcohol with phosphorus sulfide, the treatment of butyl chloride with sodium sulfide or the heating of butane with sulfur. Normal butyl mercaptans are desired and particularly the secondary butyl mercaptan.

The second step of the process involves the conversion of butyl mercaptan to a sulfide, such as dibutyl disulfide, by an oxidation reaction. This is conveniently accomplished by oxidizing with sodium hypochlorite in the presence of an alkali, for example, sodium hydroxide. Other oxidizing agents may be used. Thus, sulfur may be used in the presence of sodium plumbite, or air may be employed in the presence of copper chloride or other copper salt solutions at ordinary temperatures or at elevated temperature in the presence of contact catalysts such as copper, iron or iron sulfide catalysts. The general reaction is indicated as follows:

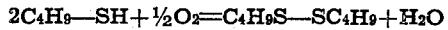

When sodium plumbite is used the reaction is:

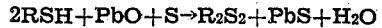

The next step in the process involves the conversion of the disulfide to the diene by heating with or without the presence of a catalyst. A catalyst of the dehydration or dehydrosulfurization type is employed. Copper, zinc, cadmium or silver sulfides are effective and I may also use aluminum oxide, magnesium oxide, chromium oxide, tungsten oxide, cobalt or molybdenum sulfide, alone or in combination. Dehydrosulfurization temperatures of the order of 400 to 700° C. may be employed.

The dialkyl disulfide, for example, dibutyl disulfide, prepared as indicated is subjected to desulfurization by contacting with the catalyst at a high velocity, a space velocity of about 1 to 20 being commonly employed. The reaction is as follows:

Butylene and hydrogen sulfide which are produced in the reaction may be recycled to the system for further treatment.

When a trisulfide is employed a larger yield of butadiene is anticipated as shown by the following reaction:

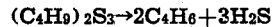

Also, when dehydrogenating catalysts of high efficiency are employed at high temperatures, it appears that one of the reactions occurring involves the formation of hydrogen, viz:

The butyl mercaptan and/or the butyl disulfide produced as intermediates in the process may be isolated or they may be employed as they occur in the products of the reaction wherein they are produced. Thus, in the oxidation of butyl mercaptan with air, the reaction product vapors containing butyl disulfide may be conducted directly through the contact dehydrosulfurization catalyst to convert the disulfide into butadiene which may then be recovered from extraneous gases by condensation or by absorption in an absorption liquid, charcoal or other suitable adsorbent for the diene. In general, however, I prefer to separate and purify the alkyl sulfide intermediate product before final conversion.

The following example shows the formation of butadiene from normal butyl disulfide. The disulfide was contacted with a copper sulfide catalyst at a temperature of about 543° C. The rate of contact, or space velocity, was 1 volume of liquid disulfide per hour per gross volume of catalyst. The product freed from $H_2S$ gave the following analysis:

| | Per cent |
|---|---|
| Olefins | 74.5 |
| Butadiene | 10.1 |
| Paraffins | 11.8 |
| Air | 3 |
| $CO_2$ | 0.6 |

A small amount of nitrogen was employed with the disulfide in this run. Hydrogen sulfide resulting from the reaction may be recovered.

When isoamyl disulfide is employed in this reaction, the product formed on dehydrosulfurization is isoprene. Other alkyl sulfides give other dienes.

In another modification of my process, I may prepare mercaptans from hydrocarbons, for example, the $C_4$ fraction obtained from petroleum distillation and cracking, by treating with hydrogen sulfide at elevated temperatures, preferably by passing a mixture of hydrocarbons and $H_2S$ into contact with a suitable catalyst maintained at elevated temperature. Mercaptans may be separated from the products of this reaction and processed as hereinbefore described or the entire reaction product may be converted with an oxidizing agent directly to the disulfide which may be recovered and subsequently converted into the diolefin.

The temperatures employed in the dehydrosulfurization step are usually in the range of about 350 to 700° C. Low pressures are ordinarily desirable, the pressure being generally atmospheric or subatmospheric, although pressures of the order of 10 to 50 pounds per square inch may be employed. Short catalyst contact time in the range of 0.1 to 6 seconds is desirable, and contact times in the range of .01 to 20 seconds may sometimes be used.

It is desirable to cool the products of reaction rapidly after withdrawing them from the dehydrosulfurization step. Rapid cooling may be obtained by introducing a quenching fluid directly into the reaction products, a suitable fluid being cold inert gases recycled in the system, water, oil, etc. Thus the products, hot from the reaction, may pass directly into a cold water spray. The water or other quench liquid may be recycled.

When applying my process to the $C_4$ fraction of hydrocarbons recovered from petroleum processing, for example, from the cracking or reforming of hydrocarbons containing about 12 to 20% of isobutylene and about 20% of normal butylene, a mixed isobutyl-normal butyl disulfide may be obtained which on dehydrosulfurization yields butadiene and isobutylene as indicated by the following equation:

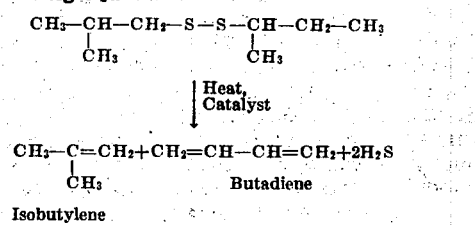

The isobutylene may be recovered from the product and employed in other processes, for example, it may be polymerized to isooctene in the preparation of antiknock motor fuels or it may be polymerized to synthetic lubricating oils, resins, synthetic rubber, etc. Isobutylene may also be added, preferably in amounts not exceeding equal molecular amounts to normal butylene, and the mixed hydrocarbons may be treated by my process as hereinabove described, the isobutylene being recycled. In general, however, I prefer to isolate the normal butylenes from the $C_4$ mixture before converting to the sulfides. Also, I prefer to use the disecondary butyl disulfide.

In another modification of my process the yield of butadiene obtained from the dehydrosulfurization of dibutyl disulfide may be increased by introducing sulfur vapor or oxygen into the dehydrosulfurization catalyst simultaneously with monosulfide or dibutyl disulfide. The amount of sulfur or oxygen employed in this way is preferably about 1 atom per molecule of dibutyl disulfide treated and more in the case of butyl monosulfide.

Although I have described my invention particularly as it is applied to the preparation of butadiene, the invention is intended to include also the manufacture of other dienes, particularly isoprene and dimethyl butadiene. I may also employ mixtures of sulfides, for example, ethyl, propyl and butyl sulfides, monosulfides, disulfides and polysulfides, and mixtures of dienes may be obtained which may be either separated or used in the form of mixtures, if desired, in the final conversion step. Unreacted olefins or paraffins may be separated from the desired dienes by azeotropic or extractive distillation in the presence of polar solvents in the manner known to the art.

My process may be better understood by referring to the drawing which shows diagrammatically one procedure for carrying it out. Referring to the drawing, butylene, preferably one of the normal butylenes, butylene-1 or butylene-2, or a mixture of them either alone or with other hydrocarbons or inert gases, is introduced by line 10 to catalytic reactor 11 along with hydrogen sulfide added by line 12. On contact with the catalyst, for example, zinc sulfide, aluminum oxide, etc., at a moderately high temperature in the range of 200 to 500° C., there is formed butyl mercaptan, the secondary butyl mercaptan generally predominating over the primary compound.

The reaction products from 11 are passed by line 13 to fractionator 14 where the mercaptan is condensed and withdrawn at the bottom. The unreacted gases, butylene and $H_2S$, are recycled to the reactor 11 by line 15. The mercaptan is conducted by line 16 to reactor 17 where it is converted to the disulfide by reaction with air admitted by line 18. A suitable catalyst for reactor 17 is iron, copper, iron sulfide, etc., the reaction temperature being moderately low, of the order of 100 to 200° C.

The product from 17 is passed by line 19 to fractionator 20 where the butyl disulfide is separated from the lighter products and unreacted gases which may be discharged by vapor line 21.

The butyl sulfide is withdrawn from 20 by line 22 and charged to reactor 23 where it is contacted with copper sulfide or other suitable contact catalyst hereinbefore described, employing a relatively high temperature and short contact time. In reactor 23 a substantial proportion of the butyl sulfide is decomposed to butadiene and hydrogen sulfide, a substantial amount of by-product butylene being obtained in some cases. A controlled amount of air or sulfur vapor may be introduced to the reactor 23 by line 24 to facilitate the formation of butadiene, especially where the sulfide is a mono- or disulfide.

The reaction products of 23 pass by line 25 to quench drum 26 where they are rapidly cooled by a spray of quenching liquid which may be water introduced by line 27. Unreacted butyl sulfide and water collect in the bottom of drum 26, the water being drawn off by line 28 and recycled through pump 29 and line 27. Fresh make-up water may be added as needed by line 30. Butyl sulfide is withdrawn at a higher level by line 31 and charged to fractionator 32 wherein it is separated from light products and residue, the residue being discarded by line 33 and the light products being returned by line 34 to drum 26. Butyl sulfide is withdrawn by line 35 and recycled back to reactor 23.

From the upper part of drum 26 vapors and gases are withdrawn by line 36 and compressed to several atmospheres pressure by compressor 37. The compressed gases and vapors then flow by line 38 to fractionator 39 wherein they are simultaneously fractionated and solvent-extracted by a suitable solvent introduced by line 40. As indicated hereinabove, solvents suitable for this purpose are polar compounds, generally oxygen, halogen or sulfur compounds such as sulfuric acid esters, sulfonic acids, alcohols, aldehydes, ketones, esters and chlorine compounds in general. Phenol, aniline, cresylic acid, dichlordiethylether, and nitromethane may be specifically mentioned. The operation of fractionator 39 is simplified by the use of a relatively non-volatile solvent such as phenol. If desired, H₂S may be separated and removed by a pre-fractionation step (not shown) in advance of fractionator 39.

In fractionator 39 butadiene and the solvent descends through the column and are withdrawn by line 41 leading to flash drum 42 where the pressure is released and butadiene product is discharged from the process by line 43, while the solvent is withdrawn by line 44 and recycled back to 39 by line 40. Uncondensed gases, butylene, H₂S, etc., are withdrawn from the upper part of fractionator 39 by line 45 and recycled through valve 46 to reactor 11. When H₂S is present in 39, it will contaminate the product in line 43 to some extent and must be removed by an alkali wash or other operation.

It is apparent that various modifications and substitutions may be made in the process as just described without departing from the spirit of the invention which is intended to be broadly defined by the following claims. Where the term "alkyl sulfide" is used in the specification, drawing and claims, it is intended to include the monosulfides, disulfides and polysulfides.

I claim:

1. The process of preparing dienes which comprises subjecting an alkyl sulfide having at least four carbon atoms to the action of a dehydrosulfurizing contact catalyst at a temperautre of about 350 to 700° C. and a contact time within the range of about .01 to 20 seconds, cooling the reaction products at a sufficiently rapid rate to avoid destruction of dienes and separating the desired diene from the said reaction products.

2. The process of claim 1 wherein the said alkyl sulfide is a butyl disulfide.

3. The process of claim 1 wherein said alkyl sulfide is a normal butyl disulfide.

4. The process of claim 1 wherein the said alkyl sulfide is a secondary butyl disulfide.

5. The process of preparing diolefins which comprises treating an alkyl monosulfide with an oxidizing agent selected from the class consisting of oxygen and sulfur in the presence of a dehydrosulfurization contact catalyst at a temperature within the range of about 350 to 700° C., cooling the reaction products at a sufficiently rapid rate to avoid destruction of dienes and separating the desired diene from said reaction products.

6. The process of making butadiene which comprises converting normal butylene into a butyl mercaptan by the action of hydrogen sulfide in the presence of a sulfurizing catalyst, converting said butyl mercaptan to butyl sulfide by the action of an oxidizing agent, converting said butyl sulfide to butadiene and hydrogen sulfide by the action of a dehydrosulfurizing catalyst at a temperature within the range of about 350 to 700° C., and a reaction time and concentration to produce a substantial yield of butadiene, recovering said butadiene and recycling said hydrogen sulfide to the first step of the process.

7. The process of making butadiene which comprises converting normal butylene into a butyl mercaptan by the action of hydrogen sulfide in the presence of a sulfurizing catalyst, converting said butyl mercaptan into butyl disulfide by the action of an oxidizing agent, converting said butyl sulfide to butadiene and hydrogen sulfide by the action of a dehydrosulfurizing catalyst at an elevated temperature within the dehydrosulfurization range and a reaction time and concentration to produce a substantial yield of butadiene, recovering said butadiene from the reaction products, separating hydrogen sulfide and butylene from the reaction products and recycling said hydrogen sulfide and butylene to the first step of the process.

8. The process of preparing diolefins from unsaturated hydrocarbon gas mixtures containing olefins of at least 4 carbon atoms which comprises converting said olefins to the corresponding alkyl sulfides, subjecting said alkyl sulfides to the action of a dehydrosulfurization catalyst in the presence of controlled amounts of an oxidizing agent selected from the class consisting of sulfur and oxygen at a temperature within the range of about 350 to 700° C. and at a concentration and reaction time at which said alkyl sulfides are decomposed into hydrogen sulfide and diolefins, and recovering said diolefins from the reaction products.

BERNARD H. SHOEMAKER.